(12) United States Patent
Rao et al.

(10) Patent No.: US 6,460,107 B1
(45) Date of Patent: Oct. 1, 2002

(54) INTEGRATED REAL-TIME PERFORMANCE MONITORING FACILITY

(75) Inventors: Ravi S. Rao; Byron R. Gillespie, both of Phoenix; Elliot Garbus, Scottsdale; Dinesh Ranganathan, Phoenix, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/301,870

(22) Filed: Apr. 29, 1999

(51) Int. Cl.[7] .............................. G06F 13/14; H02H 3/05
(52) U.S. Cl. ........................................ 710/305; 714/44
(58) Field of Search .............................. 714/44; 710/305

(56) References Cited

U.S. PATENT DOCUMENTS 4,435,759 A  3/1984  Baum et al.
5,450,349 A  9/1995  Brown, III et al.

*Primary Examiner*—Peter Wong
*Assistant Examiner*—Tim Vo
(74) *Attorney, Agent, or Firm*—Blakely, Sokoloff, Taylor & Zafman LLP

(57) ABSTRACT

Real-time performance monitoring facility in an integrated circuit (IC) data processor for monitoring events related to different bus activity. The monitoring facility is accessible via a bus connection the IC. Events include device acquisition and ownership time, and the number of requests and grants on a given bus. The events are counted as occurrences and durations by a number of event counters integrated in the IC. The IC can notify software when the counters overflow. The IC may feature multiple clock domains, including, for instance, multiple bus interfaces operating at different clock frequencies, in which events from different clock domains may be tracked by the same counter. In one embodiment, the performance monitoring facility is integrated into an I/O processor (IOP) die that complies with the popular intelligent I/O ($I_2O$) and Peripheral Components Interconnect (PCI) specifications.

8 Claims, 9 Drawing Sheets

| Buses | Monitored Event |
|---|---|
| Secondary PCI bus | Number of grants to the Bridge |
| | Number of grants to Secondary Address Translation Unit |
| | Number of grants to DMA |
| | Number of grants to the I/O processor |
| | Number of grants to other devices external to the IOP chip |
| Primary PCI bus | Number of grants to to the Bridge |
| | Number of grants to Primary Address Translation Unit (PATU) |
| | Number of grants to the I/O processor |
| | Number of grants to DMA |
| Internal bus | Number of grants to subsystem processor |
| | Number of grants to DMA |
| | Number of times backoff (BOFF) asserted by Primary Address Translation Unit (PATU) |
| | Number of times backoff (BOFF) asserted by Secondary Address Translation Unit (SATU) |
| | Number of grants to PATU and SATU |
| Primary and Secondary PCI buses | Number of clocks the PCI bus is busy |
| | Number of clocks the PCI bus is idle. |
| | Acquisition latency and ownership time for the PATU and SATU |
| | Acquisition latency and ownership time for DMA |
| | Acquisition latency and ownership time for the Bridge |
| | Acquisition latency and ownership time for external devices and the I/O processor |
| Internal bus | Acquisition latency and ownership time for the subsystem processor |
| | Acquisition latency and ownership time for DMA |
| | Acquisition latency and ownership time for the PATU |
| | Acquisition latency and ownership time for the SATU |

Fig. 3

INTEGRATED REAL-TIME PERFORMANCE MONITORING FACILITY

BACKGROUND INFORMATION

This invention relates generally to techniques for monitoring the performance of digital integrated circuit electronics, and more particularly to monitoring the performance of a computer system having an I/O processor and multiple clock domains.

Monitoring a manufactured digital integrated circuit (IC) in real-time, i.e., while the IC is operating as part of the intended application, helps verify the performance of the functions provided by the IC to its surrounding system. This may be done with the help of logic analyzers and in-circuit emulators. The conventional logic analyzer monitors the system in real-time by sensing the external signal lines of the IC within the system. In-circuit emulators physically replace the IC and emulate its functions while simultaneously recording external signal behavior in real-time. These conventional tools are currently used by board designers, software architects, and operating system vendors to optimize the performance of the system for a particular application.

The conventional tools described above, however, do not provide access to certain internal signals of the IC which may prove to be useful for further optimizing system performance. For instance, the integrated circuit I/O processor (IOP) designed to facilitate intelligent I/O in modern computer systems is a particularly complex subsystem with multiple bus interfaces operating in different clock domains, i.e., different clock frequencies, and which may be difficult to emulate for real-time monitoring. The IOP may also have many internal signals not accessible by a logical analyzer but which could be particularly useful in optimizing the performance of the surrounding computer system. Without access to such internal IC behavior in real-time, the system developer may not be realizing the full potential of the computer system.

Another problem with the use of conventional techniques is that the logic analyzer and in-circuit emulators call for a significant amount of hardware additions and modifications to prepare the system for monitoring. This presents an additional burden to the system developer seeking to optimize a computer system for a particular application. One existing solution for monitoring the performance of a bus is the "exerciser" add-in card for Peripheral Component Interconnect (PCI) buses. Such a solution, however, requires that at least one slot on a PCI bus be dedicated to the exerciser card. This presents a problem for monitoring a system which has all of its slots occupied with other add-in cards. Also, with the exerciser card in place, the system must be configured with one fewer add-in card than originally contemplated, making the exerciser card an inefficient solution.

Therefore, there is a need for a novel technique for monitoring IC and bus operation which overcomes these disadvantages.

SUMMARY

An embodiment of the invention is directed to an integrated circuit (IC) having an internal bus, and a number of event counters coupled to the internal bus, each being responsive to one of a number of events of the internal bus. A number of registers are coupled to the event counters, each register containing a value of a respective one of the event counters. The registers are coupled to the internal bus and are accessible therefrom. An external bus is provided for receiving transactions from devices outside the IC to access the registers. An address translation unit is coupled between the internal bus and the external bus for transporting transactions therebetween.

BRIEF DESCRIPTION OF THE DRAWINGS

FIG. 3 is a list of buses and a number of related events that may be monitored according to another embodiment of the invention.

DETAILED DESCRIPTION

As summarized above, an embodiment of the invention is an integrated circuit (IC) data processor having a number of programmable event counters for counting occurrences and durations that are internal to the data processor. The counters are part of an on-chip monitoring facility that allows the system developer to optimize a multiple bus computer system in which the data processor is being used. A die containing the on-chip monitoring facility is not a test die. Rather, the monitoring facility is a part of every production chip. Monitoring software may be developed that accesses the counter registers via the internal bus to obtain event data related to any one of a number of buses to which the data processor is coupled. Using such software, the computer system containing the production chip may then be tuned for a particular application (e.g., network server or storage) without requiring the installation of a significant amount of additional hardware. Also, allowing bus access to memory mapped counter registers permits the use of existing programming techniques in writing the monitoring software. An efficient logic circuit is also disclosed for monitoring multiple clock domains running at different clock frequencies.

Figure 1:
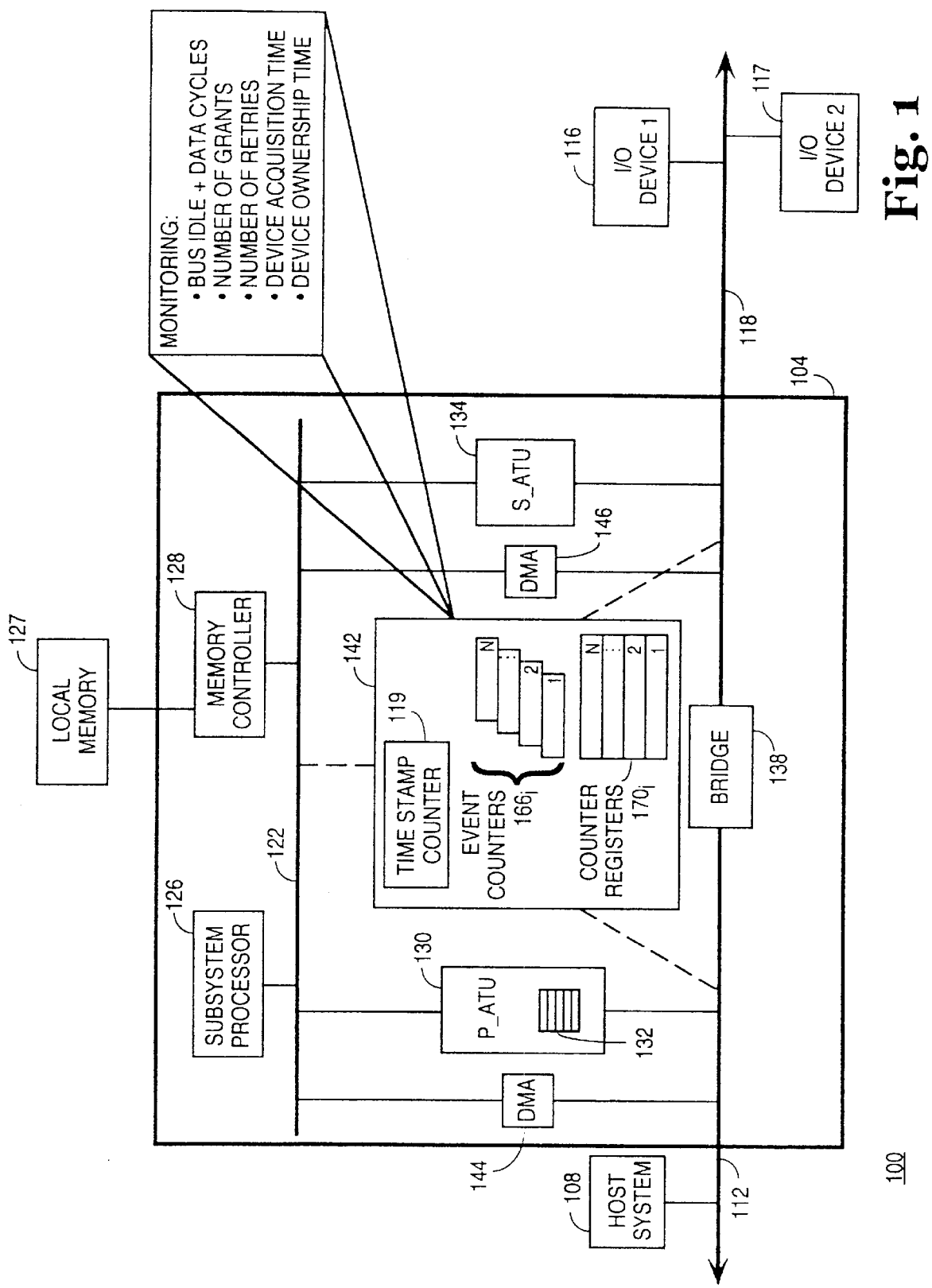
FIG. 1 is a block diagram of a computer system featuring an IC data processor with a performance monitoring facility according to an embodiment of the invention.

FIG. 1 illustrates an embodiment of the invention as a computer system 100. The system includes an IC data processor 104 which in one instance may be an I/O processor (IOP). I/O processors are used to implement an intelligent I/O subsystem for improved I/O performance in applications such as high performance network servers and redundant array of inexpensive disks (RAID) storage servers. The data processor 104 is coupled between a first bus 112 and a second bus 118. In the IOP embodiment, the first and second buses comply with the popular Peripheral Components Interconnect (PCI) bus specification, Rev. 2.1, Jun. 1, 1995.

A host system 108 is coupled to the first bus 112, while a number of I/O devices 116 and 117 are coupled to the second bus 118. Examples of I/O devices are network adapter cards and disk controllers. The data processor 104 includes first and second bus interfaces (not shown) to each of the first and second buses. The first bus 112 and second bus 118 may be treated by the I/O devices as one logical bus with the help of a bridge 138. An internal bus 122 that may or may not extend outside the data processor 104 is used for communication between a subsystem processor 126 and a local memory 127 via a memory controller 128. The local memory 127 normally stores the instructions to be executed by the subsystem processor 126. Although shown here as integrated on the same die as the data processor 104, the subsystem processor 126 may alternatively be implemented as a separate die. Communication between the first and second buses and the internal bus 122 is accomplished via a number of bridge-like devices being primary and secondary address translation units P_ATU 130 and S_ATU 134. Data transfers from devices on the first bus 112 and second bus 118 to the local memory 127 may also be achieved using the respective direct memory access (DMA) channels 144 and 146.

The data processor 104 includes an on-chip performance monitoring facility 142. The dotted lines between the block representing the monitoring facility 142 and the respective buses represent signal paths that carry event information from the buses and their respective bus interfaces (not shown) to the monitoring facility 142. The events are occurrences and durations of bus activity which are caused by communication between devices on the internal bus 122 (e.g., subsystem processor 126 or memory controller 128), devices on the first bus 112 (e.g., the host system 108) and devices on the second bus 118 (e.g., the I/O devices 116 and 117). Some useful events to be monitored include bus idle and data cycles, number of grants, number of retries, device acquisition time, and device ownership time.

The monitoring facility 142 includes a number of event counters $166_1$, $166_2$, ..., $166_N$ ($166_i$) and a corresponding number of counter registers $170_1$, $170_2$, ... $170_N$ ($170_i$). Each of the registers $170_i$ contains the current count value of its corresponding event counter $166_i$. The registers $170_i$ may be read by software being executed in the system 100. The software in one embodiment may comprise instructions stored in the local memory 127 for execution by the processor 126. The registers $170_i$ may be a series of memory-mapped registers that are accessed by the software via the internal bus 122. Other configurations for accessing the registers $170_i$, however, are possible. For instance, the registers $170_i$ may be accessed via the first bus 112 and the P_ATU 130, in response to instructions stored and executed by the host system 108.

Each event counter 166 modifies, i.e., increments or decrements, its binary count value in response to a count signal being asserted. The count signal may be related to one or more control signals asserted by one or more devices on the various buses. The count signals may be obtained by performing various logic and w timing operations, known as event processing, on signals from various state machines in the data processor 104 that govern access to the buses.

Figure 2:
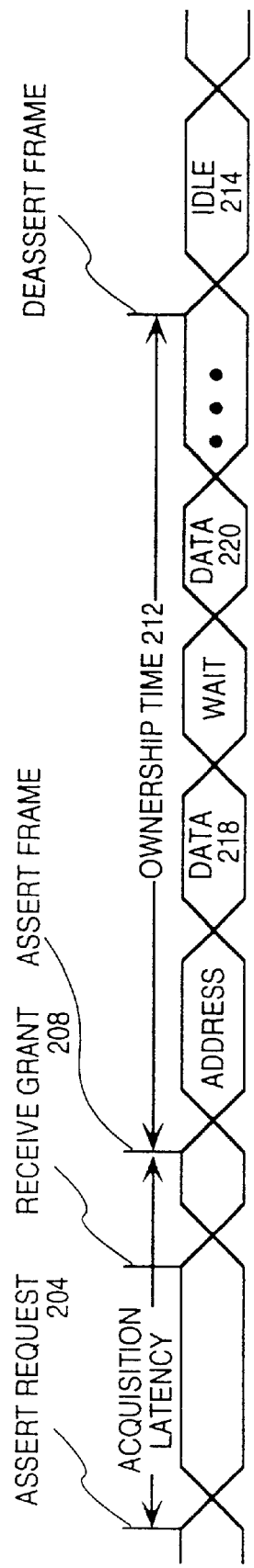
FIG. 2 illustrates events related to bus activity that may be monitored in an embodiment of the invention.

The count signals represent a variety of different occurrences and durations to be monitored, such as those in FIG. 2. Occurrences include bus request 204 and bus grant 208, and retry signals asserted by the P_ATU 130 in response to a PCI transaction request received by the data processor 104 over the first bus 112 (see FIG. 1). In addition to counting the number of occurrences, an event counter $166_i$ may be configured to count the duration in which one or more conditions are true. The duration may be the number of clock cycles of a bus during which the bus is busy, such as ownership time 212 in FIG. 2. A variety of different durations to be monitored are contemplated, including the times of bus idle 214 and data phases 218 and 220. Start and stop signals may be provided to each event counter $166_i$ after having loaded the counter with a predetermined value, where the event counter continues to increment/decrement in response to a start signal until the stop condition becomes true. FIG. 3 illustrates an exemplary list of events to be monitored in the IOP embodiment of the invention. The events relate to primary and secondary PCI buses (corresponding to first bus 112 and second bus 118 in FIG. 1). The monitored events include the number of grants to the DMA channels 144 and 146. The operation of the DMA channels, the ATUs, and the bridge are well-known by those of ordinary skill in the art and are not discussed in any detail here. In general, the monitored events may include the number of grants to any device on any one of the buses that are coupled to the IC data processor 104.

In a particular embodiment of the invention, the data processor 104 further includes a time stamp counter 119 (see FIG. 1) being responsive to a free running clock signal. The counter 119 would also be accessible to software from one or more of the buses. The time stamp counter 119 provides a time reference so that a user may determine the frequency of the occurrences counted by the event counters $166_i$. The total monitoring time can also be tracked by software reading the time stamp counter 119.

In one embodiment, the frequency of occurrences being monitored provides knowledge of data transfer rates between devices outside the IC data processor 104 and those inside the IC. A number of queues are used in the data processor 104, including at least one in each one of the ATUs, the DMAs, and the bridge. For instance, a data queue 132 inside the P_ATU 130 (see FIG. 1) may be used to buffer data transfers between the host system 108 and the subsystem processor 126. If the queue 132 does not have sufficient space to buffer the data, then a retry signal may be asserted by the P-ATU 130 on the first bus 112. The initiator of the data transfer, being the host system 108 in this example, may then make a subsequent request to transfer the data into the P_ATU. Each time a retry signal is asserted, the overhead associated with the transfer increases due to the bus cycles consumed without any data being transferred into the P_ATU. Counting the number of such retry signals in a given time interval gives an indication of the throughput between the host system 108 and the data processor 104. This mechanism is particularly useful in-the IOP embodiment of the invention for monitoring the number of requests for intelligent I/O (I₂O) transactions made to the P_ATU 130. Other events that may be of significant importance to the optimization of the overall computer system, and therefore worth monitoring, are the percentage of a time interval during which a queue is full or empty. These can provide insight into queue utilization by the system, and thereby allow the system designer to optimize the system by changing the routing of data traffic between the devices in the system. In addition, such knowledge of queue utilization can be used to improve the design of the data processor 104 itself by, for instance, changing the sizes of the various queues.

Continuing with the IOP embodiment, another type of event that may be it counted is the Backoff signal that is normally asserted by an ATU (either the P_ATU 130 or S_ATU 134). The Backoff signal is asserted by the ATU in response to having anticipated consecutive requests for transactions (read or write) by a device (e.g., the host system 108) on either the first or second buses, to access the internal bus 122. The number of times a Backoff signal is asserted by an ATU and the duration for which the signal is asserted are examples of events that are internal to the IOP and therefore not visible to a conventional exerciser card that may be coupled to either the first bus 112 or the second bus 118. When asserted, the Backoff signal instructs the requesting device to refrain from attempting to access the internal bus 112 until the Backoff signal is deasserted. The Backoff signal is normally deasserted after the first write transaction has completed. The Backoff signal thus helps keep the internal bus 122 available for a first write transaction to proceed to completion when faced with a number of consecutive write transactions. Allowing the first transaction to complete in this way helps prevent deadlock between devices on the first and second buses and the internal bus 122.

In addition to counting the number of times Backoff is asserted, the monitoring facility 142 may be configured with at least one event counter counting a duration (e.g., the number of bus clock cycles) during which Backoff is asserted. This can provide a measure of throughput between the subsystem processor 126 and a device on either the first bus 112 or second bus 118. For instance, long Backoff durations may suggest that the number of requests for outbound transactions, i.e., transactions initiated on the internal bus 122 and directed to either the first or second buses, be reduced in order to improve performance of the overall application.

Figure 4:
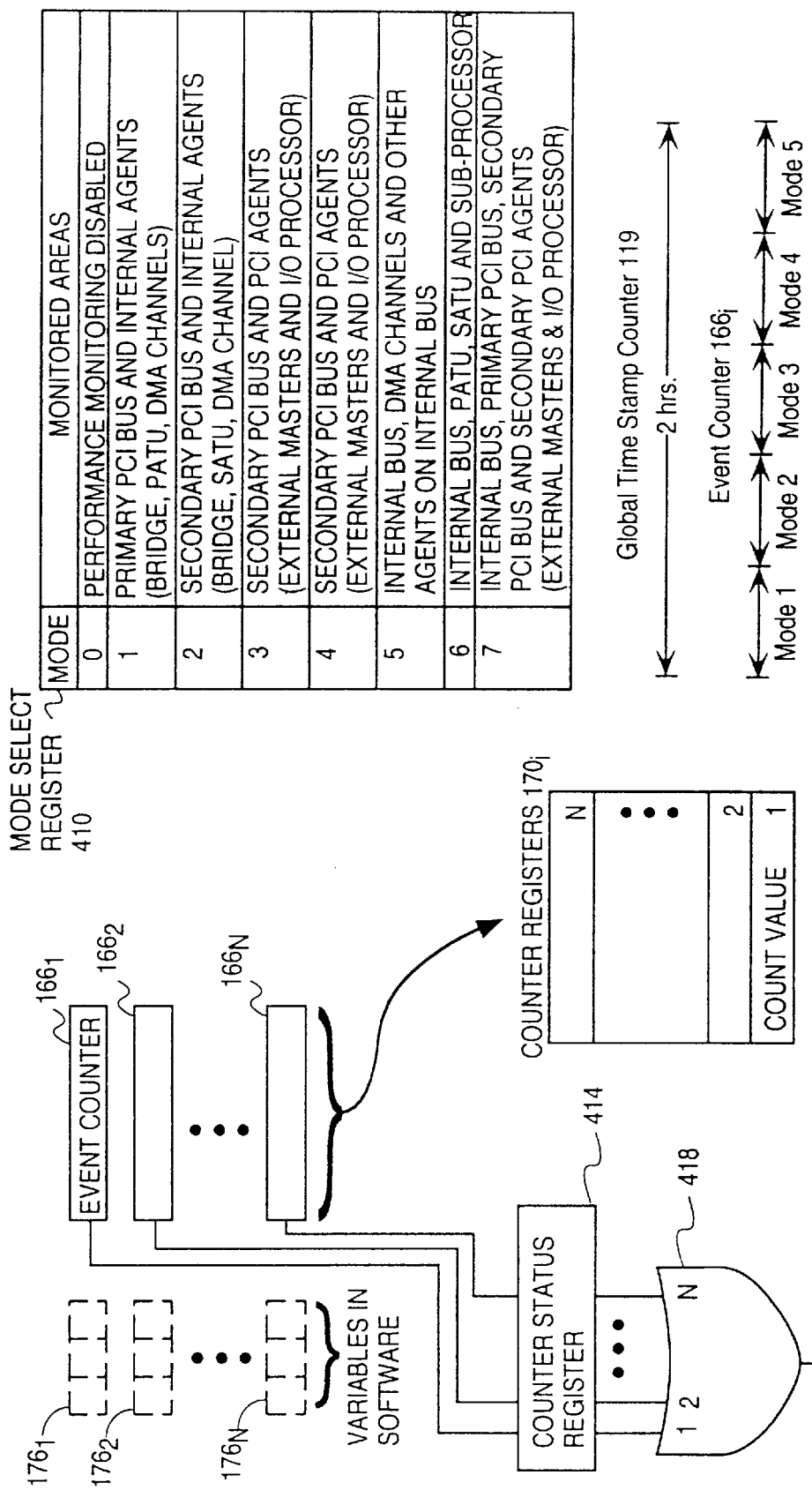
FIG. 4 shows logic hardware in the performance monitoring facility as another embodiment of the invention.

Turning now to another embodiment of the invention in FIG. 4, the performance monitoring facility 142 may be enhanced so that each event counter $166_i$ is programmable for monitoring different events. The desired events to be monitored are selected by software used for programming a mode select register 410. The mode select register 410 is used to place the monitoring facility 142 into one of a number of desired modes of operation. Each mode of operation allows selected events to be monitored, one per event counter $166_i$. A number of modes are contemplated, such as the eight shown in the embodiment of FIG. 4. The data processor 104 is configured with data paths and logic needed for coupling the event counters $166_i$ to a variety of different state machines in the data processor 104 that govern or track the behavior of the listed events. One of ordinary skill in the art will recognize that each mode may be defined to cover different combinations of events, depending on the architecture of the processor 104 and the particular performance monitoring capability desired. In one embodiment, the total monitoring interval as measured by the time stamp counter 119 is time sliced by software running on the subsystem processor 126, where in each slice of time, a different bus and/or a different set of events can be monitored by the event counter $166_i$. This can be done at any given time by simply writing to the register 410 to select the desired mode.

Another embodiment of the monitoring facility 142 as shown in FIG. 4 is one having a counter status register 414 that allows software to identify an event counter $166_i$ that may have overflowed. The status register is software-readable and is used to identify those event counters $166_i$ that have reached predetermined counts, and in particular an overflow condition. The software may use this information to manage a performance monitoring session as described below in the embodiment of FIG. 5. The counter status register 414 in one embodiment includes a number of one-bit latches each receiving a notify signal from a respective event counter $166_i$. Each counter $166_i$ can generate a notify signal in response to reaching a predetermined count while counting events. For instance, a predetermined count may be the maximum count value of the event counter $166_i$, where the notify signal in effect becomes an overflow indication that the counter it has reached its maximum count value. The notify signals are fed to OR logic 418 which has a number of inputs 1 . . . N each coupled to a respective one of the latches that are part of status register 414. The OR logic 418 forwards the notify signal to be interpreted by the software. This may be done by routing the notify signal to an interrupt input of the subsystem processor 126, such that when the signal is asserted, software causes the processor 126 to read the contents of the counter status register 414 to determine which one of the event counters $166_i$ has reached its predetermined count. As explained below in connection with FIG. 5, such a feature is useful for monitoring a large number of events using fewer event counters $166_i$ by reading and storing intermediate values of the event counters $166_i$.

Figure 5:
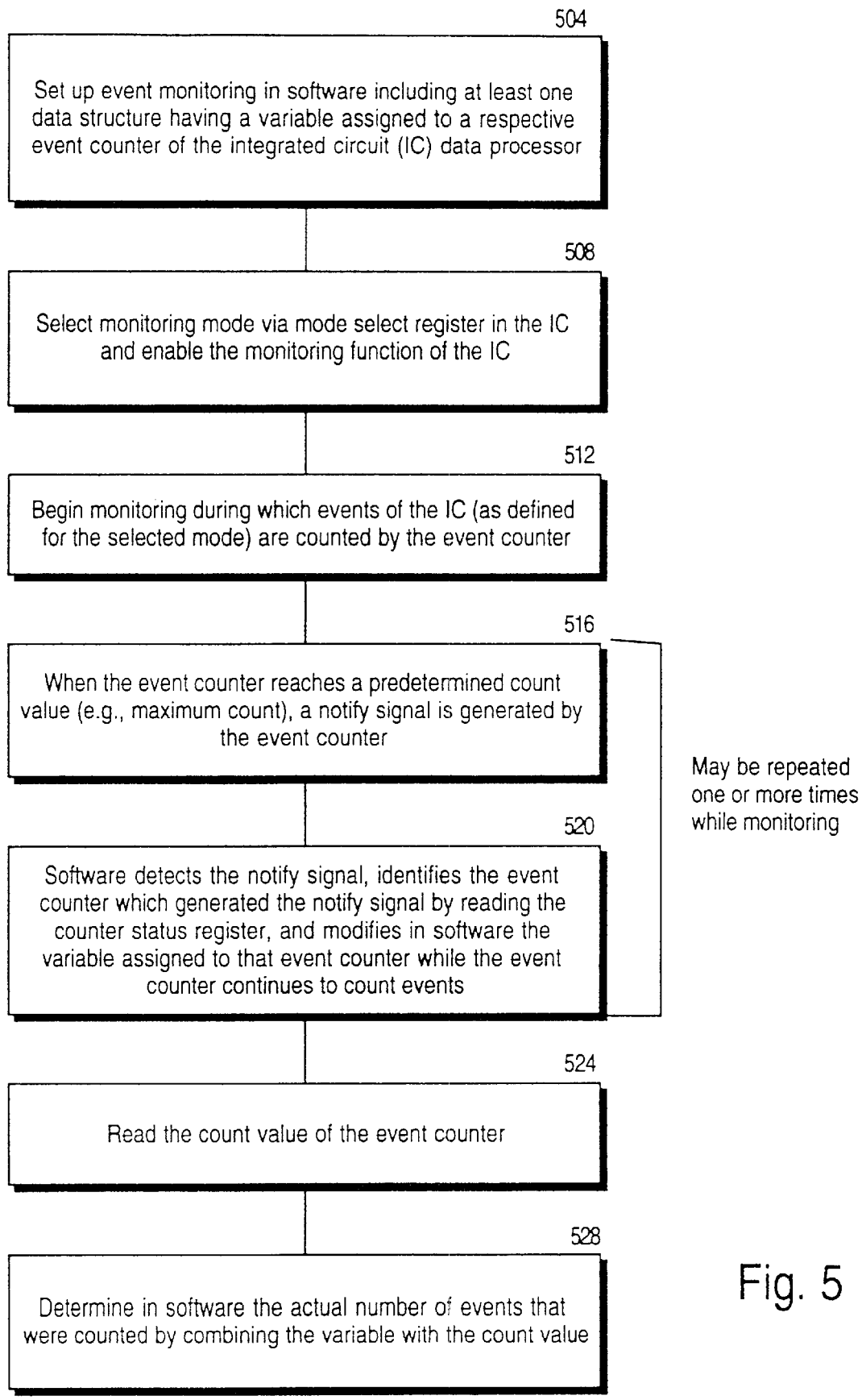
FIG. 5 describes operations performed during monitoring, according to another embodiment of the invention.

FIG. 5 illustrates another embodiment of the invention as a method of counting events using the performance monitoring facility 142 of FIG. 4. The method allows counting a relatively large number of events, such as when monitoring long durations, or when events are occurring at a high rate. Operation begins with step 504. An event monitoring session is set up in software that includes initializing a data structure having variables $176_i$ in software. Each of the variables $176_i$ is assigned its respective event counter $166_i$, and is used to track the number of times its respective event counter $166_i$ reaches a predetermined count value. The software in one embodiment may be instructions and data stored in the local memory 127 to be executed by the subsystem processor 126 (see FIG. 1).

A monitoring mode is selected by writing to the mode select register 410. Operation then continues with step 512 where the monitoring interval begins and the dataprocessor 104 is permitted to operate in its intended application during which predefined events are counted by the event counters $166_i$.

When an event counter $166_i$ reaches a predetermined count (normally a maximum count beyond which the counter will overflow), a notify signal (such as an overflow indication) is generated by the event counter $166_i$ in step 516. Software detects the notify signal in step 520 and in response modifies (e.g., increments) in software the variable assigned to the event counter from which the notify signal originated. Meanwhile, the notifying event counter may continue to count events. Steps 516 and 520 may be repeated several times during the monitoring interval.

As described earlier, one way in which the software detects the notify signal in step 520 is by an interrupt to the subsystem processor 126. Software being executed by the subsystem processor 126 first determines that the source of the interrupt is the performance monitoring facility 142. Next, the status register 414 is accessed to identify which of the event counters had reached its predetermined count. The variable $176_i$ is modified to reflect the fact that its corresponding event counter $166_i$, as indicated by the register 414, has reached the predetermined count. Operation may then continue with step 524. In step 524, the software reads the count value of one or more of the event counters $166_i$, including the one from which the notify signal originated. The software in step 528 determines the actual number of events that were counted based on the variable $176_i$ and the corresponding recently read count values. A greater number of the same events may be counted using the combination of the on-chip event counter $166_i$ and its assigned software variable $176_i$ than using only the on-chip event counter $166_i$. For instance, consider an event counter $166_i$ having a width of 32 bits and responding to events in a monitoring interval that are occurring at a rate of 66 MHz. At this given event rate, the 32-bit event counter will overflow after approximately one minute of operation. The software variable as an integer, for example, allows the monitoring interval to be extended to several hours by keeping track of the number of times its corresponding counter overflowed. One of ordinary skill in the art will recognize that a wide range of sizes may be used for the event counters $166_i$ together with an appropriate integer variable in software, depending on the monitoring requirements.

Although the operations of FIG. 5 have been described sequentially, they need not all be performed in that sequence. For instance, operation 508 of selecting the monitoring mode may be performed before the software variables $176_i$ are associated with that mode and assigned to one of the event counters $166_i$. Operations 524 and 528 may be performed at any time during a monitoring interval. Also, when switching between modes, it may be desirable that operations 524 and 528 be performed upon all of the event counters $166_i$.

Figure 6:
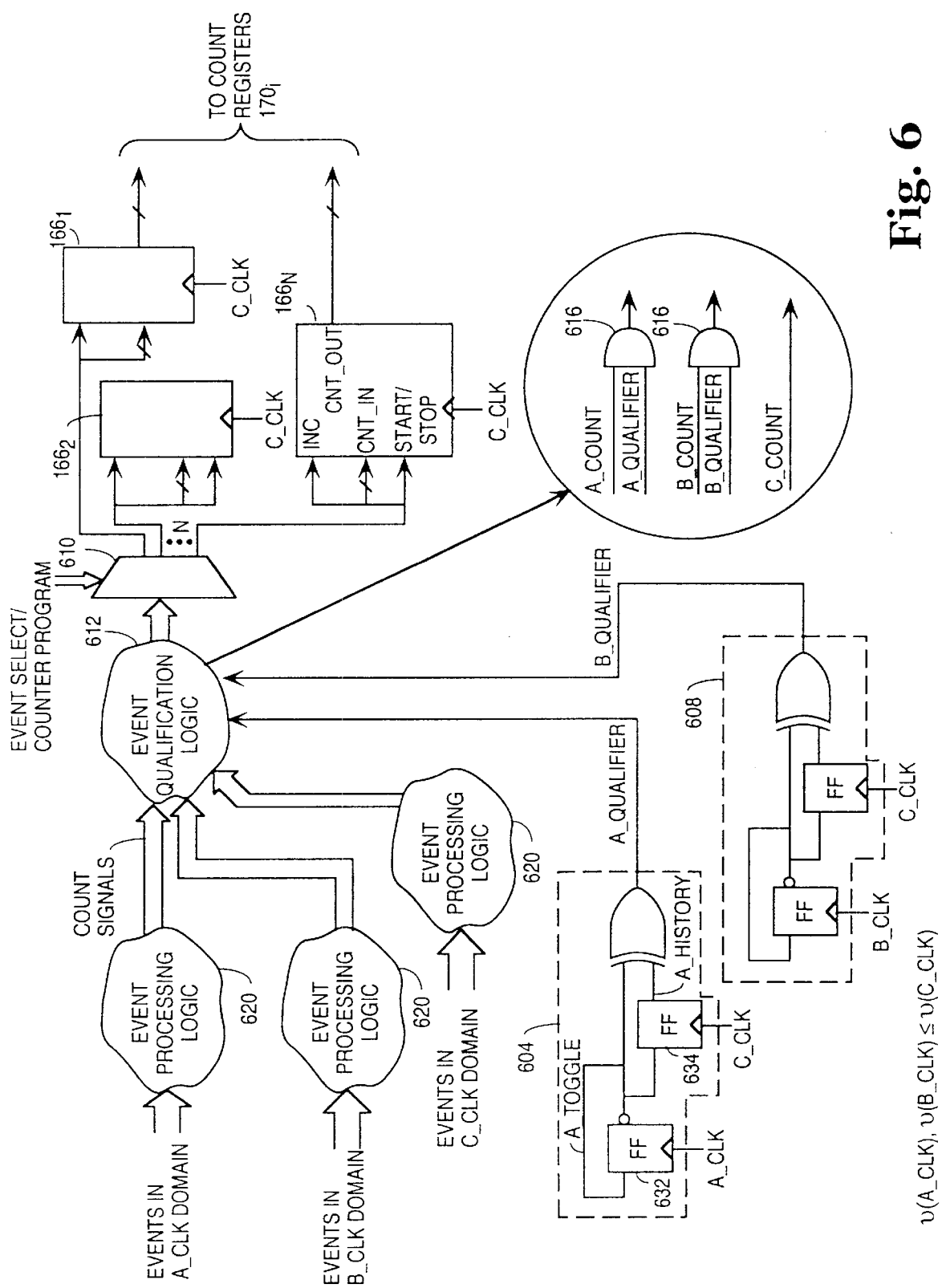
FIG. 6 illustrates a block diagram of logic circuitry used for counting events from multiple clock domains, according to an embodiment of the invention.

The embodiment illustrated in FIG. 6 allows the same event counter $166_i$ to monitor events occurring at different frequencies in different modes. For instance, in one mode an event counter $166_i$ may be monitoring the first bus 112 which is operating at a bus clock frequency of 33 MHz. In another mode, the same event counter $166_i$ may be monitoring the internal bus 122 which is operating at 66 MHz. FIG. 6 illustrates a block diagram of logic circuitry for achieving such a function, according to another embodiment of the invention.

As was suggested earlier, the performance monitoring facility may be part of a system or an IC die that contains multiple clock domains that operate based on different clock frequencies. The clock domains may include multiple bus interfaces having bus clock signals that operate at the first and second frequencies, respectively, such as in the embodiment of FIG. 1. In that case, the events to be counted are related to bus transactions on the internal bus 122 and the first external bus 112, and are based on control signals received from their respective bus interfaces (not shown). The performance monitoring facility may be programmable to allow each event counter to count events in any one of the clock domains. FIG. 6 shows an exemplary logic circuit for achieving the function of monitoring different clock domains using the same event counter. Here, each event counter $166_i$ is configured to update its count value when its count input INC is true and upon a rising edge at 1N its clock input. The count input INC receives a qualified count signal from multiplexer and counter programming logic 610. In addition, each counter may also receive a start/stop signal for starting or stopping the counter, and a count value at its CNT_IN input to load the counter with a predetermined count value. These control signals are all received from multiplexer and counter programming logic 610. The qualified count signals are derived by event qualification logic 612. The qualified count signal represents an event from any one of the given clock domains A, B, and C, to be counted by the selected event counter. Specifically, the event qualification logic 612 may feature a series of AND logic gates 616, one for each count signal received from event processing logic 620. The other input of each AND logic gate 616 is a respective one of a domain qualifier signal, A_qualifier and B_qualifier. The domain qualifier signals are generated by respective qualifier circuits 604 for the A clock domain and 608 for the B clock domain.

In the particular embodiment of FIG. 6, the qualifier circuits 604 and 608 are designed to provide a qualifier pulse signal to synchronize events occurring in the A and B clock domains with events occurring in the C clock domain. Events in the C clock domain are generated based on a clock signal having a frequency greater than or equal to the clock signal frequencies in both the A and B clock domains. The event counters $166_i$ are clocked by the fastest clock signal, namely the C clock in this embodiment. As can be appreciated by referring to the timing diagrams in FIGS. 7–9 below, the qualifier circuit 604 allows events in the A clock domain to be properly counted by a synchronous counter having a clock signal frequency that is higher than the A clock signal frequency. Thus, each event counter 166 is able to properly count events in the A and B clock domains using a relatively space-efficient logic circuit that includes the A and B qualifier circuits 604 and 608 and a series of AND gate 616.

Figure 7:
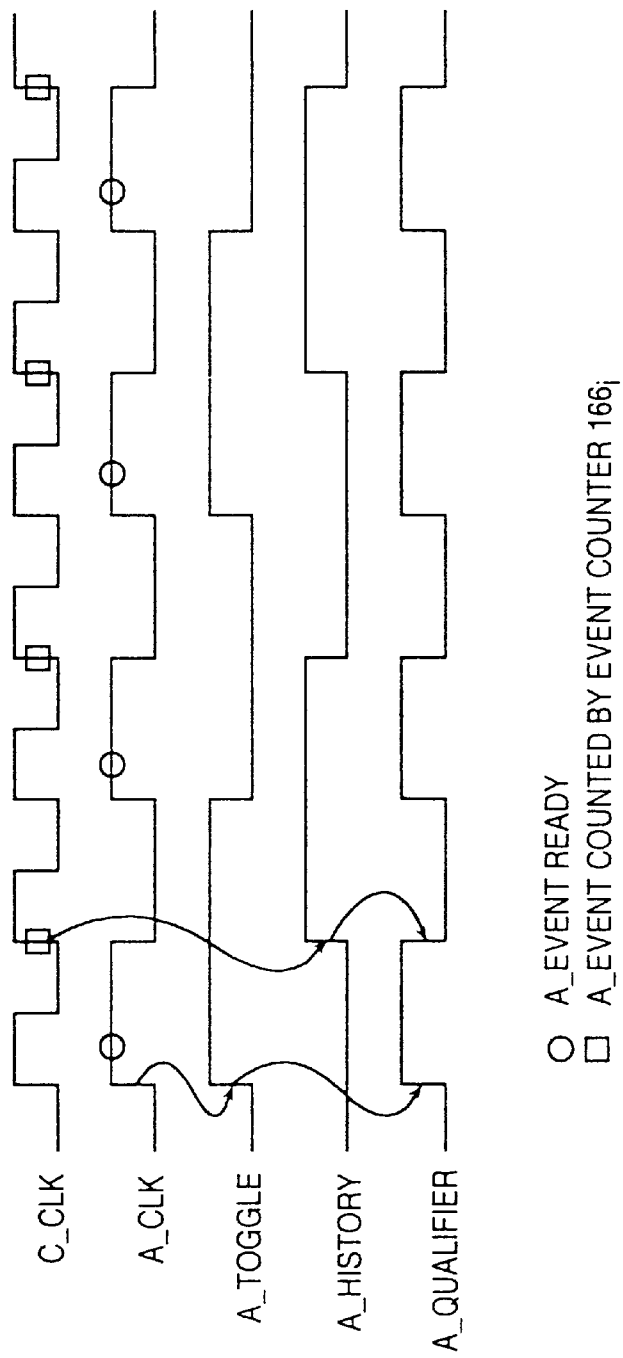
FIG. 7 shows the timing diagram of a clock qualifier circuit for the embodiment of FIG. 6.

FIG. 7 illustrates a timing diagram that explains operation of the qualifier circuit 604. In this case, the qualifier circuit 604 includes a first flipflop 632 having its output inverted and fed back to its input. A second flipflop 634 has its input connected to the inverted output of the first flipflop. An output of the second flipflop 634 and the inverted output of the first flipflop 632 are Exclusive-Ored by the gate 638 to provide the A_qualifier signal. The first flipflop 632 receives at its clock input the A_CLK signal while the second flipflop 634 receives at its clock input the C_CLK signal. The frequency of the C clock signal is greater than or equal to the frequency of the A clock signal.

Figure 8:
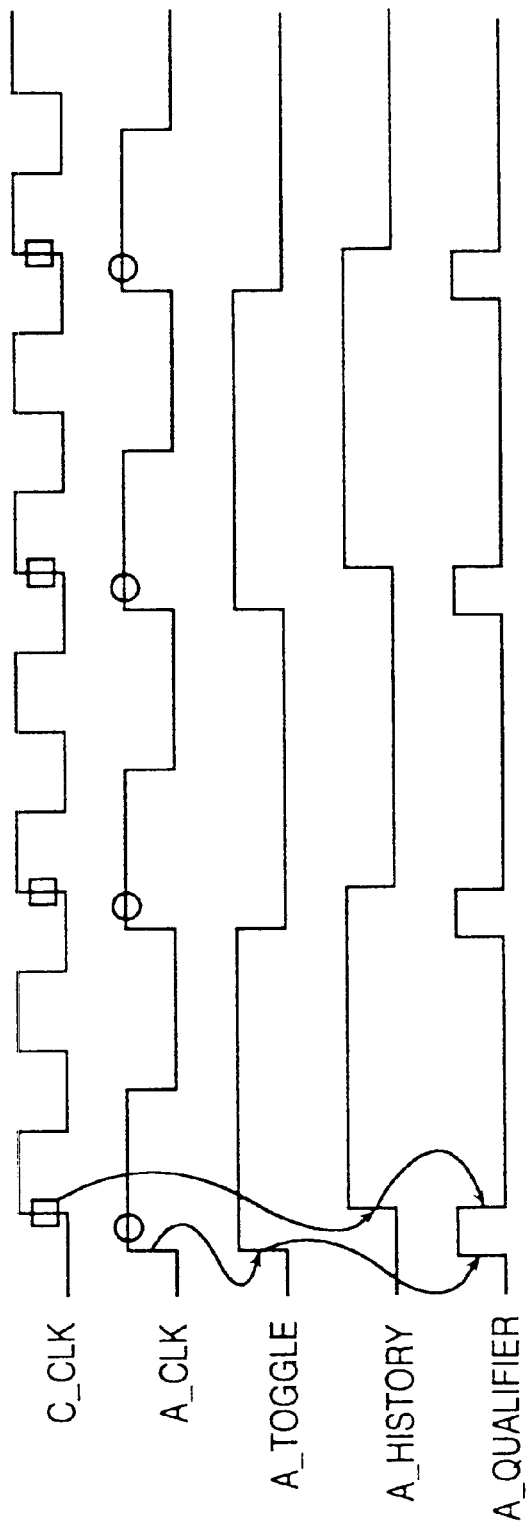
"FIGS. 8–9 shows the timing diagram of the qualifier circuit 604 when the A clock rising edge either leads or lags the C clock rising edge."
Figure 9:
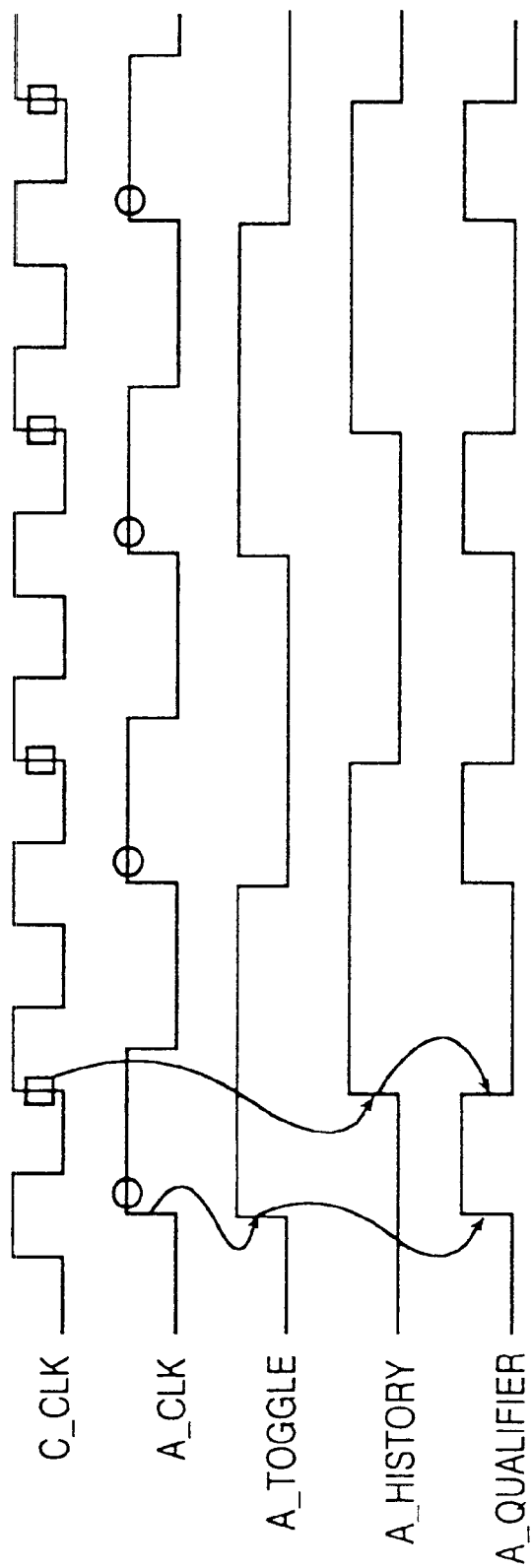

Turning to the timing diagram of FIG. 7, in this case the rising edges of C clock and A clock occur at substantially the same time, and where the C clock is twice as fast as A clock. FIGS. 8 and 9 below demonstrate operation of the qualifier circuit 604 when the A clock rising edge either leads or lags the C clock rising edge. As will be seen from these three examples, the A_qualifier pulse starts in response to the rising edge of the A clock signal and ends prior to the second rising edge of the C clock signal that follows the A clock rising edge. Thus, when an event in the A domain becomes ready after the rising edge of A clock, the event is counted only once at the next rising edge of C clock. Indeed, as seen in FIGS. 8 and 9, the qualifier circuit 604 continues to operate properly when A clock leads or lags C clock. This particular embodiment of the qualifier circuit 604 causes the qualifier pulse to end in response to the first rising edge of the C clock signal that follows the A clock rising edge. The qualifier circuit 604 and its associated AND logic gates 616 (see FIG. 6) provide a space-efficient technique for synchronizing events between different clock domains. In addition, the circuitry will function properly so long as the set up and hold times at the two flipflops 632 and 634 in the qualifier circuit 604 are met, without being affected by skew in the A clock and C clock signals.

To summarize, the embodiments of the invention described above are directed at a method and apparatus for real-time performance monitoring of an integrated circuit data processor and its surrounding system application. The embodiments described above are, of course, subject to some variations in structure and implementation. For instance, although shown as a block with fixed boundaries in FIG. 1, the monitoring facility 142 may be a type of distributed entity where the actual logic circuits used to implement its functions are spread among the various buses and devices that are inside the data processor. Therefore, the scope of the invention should be determined not by the embodiments illustrated but by the appended claims and their legal equivalents.

What is claimed is:

1. An integrated circuit (IC) comprising:
   internal bus;
   a plurality of event counters coupled to the internal bus, each being responsive to one of a plurality of events of the internal bus, wherein the plurality of events include a grant of bus ownership to a bus master on the internal bus, and wherein at least one of the events represents a portion of total ownership time of the internal bus, and wherein at least one of the plurality of events represents an acquisition latency of the internal bus;

a plurality of registers coupled to the event counters, each containing a value of a respective one of the event counters, the registers being coupled to the internal bus and accessible therefrom; and address translation unit coupled between the internal bus and an external bus for transporting transactions therebetween, wherein the internal bus, the plurality of event counters, the plurality of registers, and the address translation unit are formed on the same IC chip being a production chip and not a test chip.

2. The IC of claim 1 wherein the internal and external buses operate at different bus clock frequencies, the IC being configurable to allow each of the event counters to count events related to any one of the buses.

3. The IC of claim 1 further comprising time stamp counter coupled to and being accessible from the internal bus, the time stamp counter being responsive to a free-running clock signal for indicating a total monitoring time interval.

4. The IC of claim 1 further comprising processor coupled to the internal bus;

plurality of latches, each for latching a notify signal received from a respective one of the event counters in response to the respective one reaching a predetermined count; and OR logic having a plurality of inputs, each input coupled to a respective one of the latches, the OR logic forwarding the notify signal to the processor.

5. The IC of claim 2 further comprising a plurality of mode select registers for defining a plurality of modes of operation for the event counters, each mode defining a plurality of events to be monitored by the event counters.

6. A computer system comprising first bus;

first device coupled to the first bus;

second device;

integrated circuit data processor coupled to the first bus, the data processor having an internal bus to which the second device is coupled, a plurality of event counters coupled to the internal bus, each event counter being responsive to one of a plurality of events of the internal bus, a plurality of registers coupled to the event counters each containing a value of a respective one of the event counters, the registers being coupled to the internal bus and accessible therefrom, and address translation unit coupled between the internal bus and the first bus for transporting transactions therebetween, wherein the internal bus, the plurality of event counters, the plurality of registers, and the address translation unit are formed on the same IC chip being a production chip and not a test chip, the event counters being responsive to a plurality of events on the internal bus and on the first bus caused by communication between the first and second devices wherein the plurality of events include a grant of bus ownership to a bus master on the internal bus, and wherein at least one of the events represents a portion of total ownership time of the internal bus, and wherein at least one of the plurality of events represents an acquisition latency of the internal bus.

7. The computer system of claim 6 further comprising:

second bus coupled to the data processor;

second address translation unit inside the data processor and coupled between the second bus and the internal bus; and I/O device coupled to the second bus, at least one event counter being configured to be responsive to events on the second bus caused by communication between the I/O device and the second device via the second ATU.

8. The computer system of claim 6 wherein the first bus and the internal bus operate at different bus clock frequencies, the data processor being configurable to allow each of the event counters to count events related to any one of the buses.

* * * * *